Figure 1:
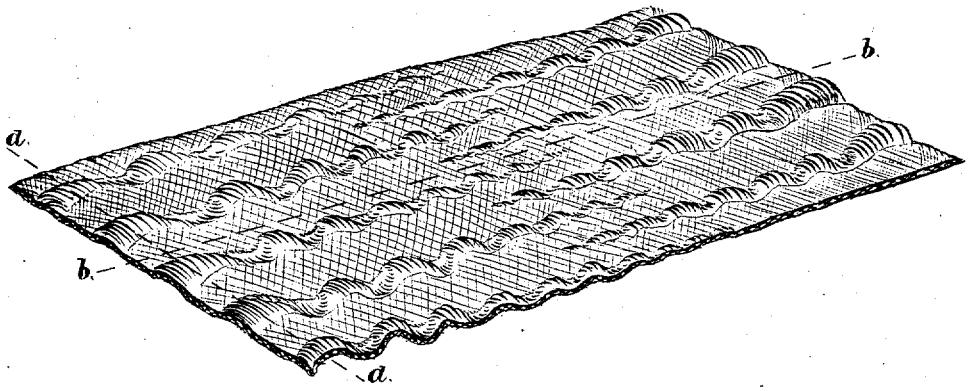

J. E. POLLARD.

Felted Fabrics.

No. 5,852. Reissued April 28, 1874.

*Witnesses*

Alfred Rodman

Edward F. Wilder

*Inventor*

James E. Pollard

AM. PHOTO-LITHOGRAPHIC Co. N. Y. (OSBORNE'S PROCESS.)

UNITED STATES PATENT OFFICE.

JAMES E. POLLARD, OF NORFOLK, MASSACHUSETTS, ASSIGNOR TO THE ELLIOTT FELTING-MILLS.

IMPROVEMENT IN FELTED FABRICS.

Specification forming part of Letters Patent No. 147,165, dated February 3, 1874; reissue No. 5,852, dated April 28, 1874; application filed March 21, 1874.

*To all whom it may concern:*

Be it known that I, JAMES E. POLLARD, of Norfolk, Massachusetts, have invented an Improvement in Felted Fabrics, of which the following is a specification:

This invention consists of felt cloth made to imitate a quilted fabric, and is especially applicable as material for felt skirts.

This fabric is produced by taking felt cloth, as made by any suitable process, and passing it between heated calender-rolls, one of which, at least, is grooved or engraved by any suitable design, and the feeding-rolls which feed the cloth to the heated rolls are made to vibrate, so as to give a jerking motion to the cloth as it passes to the heated rolls. The fabric being firmly grasped by those parts of the rolls which impress the design upon it, the jerking or wrenching the cloth produced, as described, causes a succession of puckers to be formed in those parts of the fabric which are impressed by the raised portions of the rolls. The parts which are firmly grasped by the prominent parts of the heated rolls have a smooth polish, while those portions which pass under the depressions in the heated rolls have a dull surface. These portions are in contrast with each other in color, and the puckers in the smooth parts impart a quilted or puffy look to the felt.

The apparatus suitable for forming this kind of cloth I have described in another patent of even date with this, and therefore need not be more particularly described, as in this I claim only the improved fabric which is produced by the working of said machine.

In the drawing, the raised portions show those parts which have been impressed and smoothed by the raised portions of the heated rolls, and puckered by the jerking or wrenching the fabric, as above described.

Figure 2:
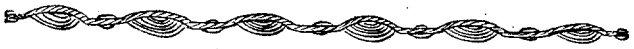
Figure 3:
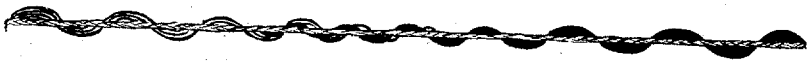

Figure 1 is a perspective view; Fig. 2 section through line *a a;* and Fig. 3, a section through line *b b*, Fig. 1.

Instead of simple grooves in the heated roll, I may make checks, screw-formed grooves, or any other device, so as to give great variety to the surface of the fabric. The engraved and raised portions also give stiffness to the fabric in much the same manner that quilting would.

Having thus described my invention, what I claim, and desire to secure by Letters Patent of the United States, is—

The improved felt fabric herein described, having a portion of its surface smoothed by means of hot engraved rolls and shirred or puckered, so as to give an imitation quilted fabric, as described.

JAMES E. POLLARD.

Witnesses:
ROBERT THOMAS,
E. F. WILDER.